United States Patent [19]

Ryan

[11] Patent Number: 4,621,666

[45] Date of Patent: Nov. 11, 1986

[54] TWO WHEEL AGRICULTURAL FEED BAGGER

[75] Inventor: Kelly P. Ryan, Blair, Nebr.

[73] Assignee: Kelly Ryan Equipment Co., Blair, Nebr.

[21] Appl. No.: 785,763

[22] Filed: Oct. 9, 1985

Related U.S. Application Data

[63] Continuation of Ser. No. 597,107, Apr. 2, 1984, abandoned.

[51] Int. Cl.[4] .......................... A01F 25/16; B65G 3/04
[52] U.S. Cl. ..................................... 141/114; 100/100; 100/177
[58] Field of Search .................. 100/41, 65, 100, 177; 141/10, 71, 114

[56] References Cited

U.S. PATENT DOCUMENTS

| | | | |
|---|---|---|---|
| 1,448,616 | 3/1923 | Dobson et al. | 100/67 |
| 1,588,681 | 6/1926 | Haney | 100/99 |
| 1,911,535 | 5/1933 | Schultze | 56/400.02 |
| 2,362,861 | 11/1944 | Russell | 100/100 X |
| 3,108,658 | 10/1963 | Bassett | 188/72.3 |
| 3,229,320 | 1/1966 | Cymara | 15/348 |
| 3,252,277 | 5/1966 | Weichel | 56/345 |
| 3,348,475 | 10/1967 | Fenster et al. | 100/177 |
| 3,687,061 | 8/1972 | Eggenmuller et al. | 100/65 |
| 3,849,043 | 11/1974 | Doering | 15/79 R |
| 3,888,170 | 6/1975 | Doering | 100/177 |
| 4,034,543 | 7/1977 | Voth et al. | 100/45 X |
| 4,046,068 | 9/1977 | Eggenmuller et al. | 100/65 |
| 4,236,444 | 12/1980 | Seffrood | 100/65 |
| 4,308,901 | 1/1982 | Lee | 141/114 |
| 4,310,036 | 1/1982 | Rasmussen et al. | 141/114 |
| 4,337,805 | 7/1982 | Johnson et al. | 141/71 |
| 4,567,820 | 2/1986 | Munsell | 100/145 X |

FOREIGN PATENT DOCUMENTS 2151116 8/1978 Fed. Rep. of Germany.

OTHER PUBLICATIONS

Eberhardt Silopresse 401 Spare Parts List, published prior to Jul. 1975.
"Introduction"-Eberhardt Silopress 401-Working Instructions.

*Primary Examiner*—Stephen Marcus
*Assistant Examiner*—Mark Thronson
*Attorney, Agent, or Firm*—Wood, Dalton, Phillips, Mason & Rowe

[57] ABSTRACT

A loading apparatus for loading feed stock into agricultural bags wherein the loading apparatus has a housing with a hopper, a passageway communicating with the hopper and a tunnel communicating with the passageway. The tunnel supports the open mouth of an agricultural bag to be filled. A rotor is drivingly located in the passageway. The rotor and passageway have widths approximately two thirds the width of the tunnel. The tunnel has an expanding chamber, a forming chamber and a guide member. The expanding chamber has a rear wall extending substantially vertically and has side walls diverging outwardly all with the view to accommodating the mass of feed stock received from the rotor in the passageway. The rotor has flanges on the ends within the passageway and mount plural pairs of teeth spaced about the circumference thereof. The relatively short rotor is driven at relatively high speeds, which when combined with the pairs of teeth moves the feed stock rapidly and effectively into the tunnel where it fills the tunnel before discharge into the bag. Brakes are provided on the wheels on the housing which brakes are preloaded so that built-up of pressure of material between the closed end of the bag and the tunnel will advance the loading apparatus to deposit the compacted feed stock in the bag.

35 Claims, 12 Drawing Figures

TWO WHEEL AGRICULTURAL FEED BAGGER

This is a continuation of application Ser. No. 597,107 filed Apr. 2, 1984, now abandoned.

DESCRIPTION

TECHNICAL FIELD

This invention relates to an apparatus for loading agricultural feed stock into expansible storage receptacles or agricultural bags and more particularly to an improved apparatus for more rapidly and more completely filling the storage receptacles or agricultural bags.

BACKGROUND OF THE INVENTION

Horizontally expansive silage storage bags have become known and used as an alternative to permanent storage structures, such as barns or silos. Suc storage bags are desirable from an economical standpoint and are advantageous in that they are easily loaded and the stored material is readily accessible.

A currently existing apparatus for loading such receptacles is disclosed in U.S. Pat. No. 4,046,069 to Eggenmuller et al wherein an apparatus for bagging silage is shown. A loading channel supports an unfilled bag and guides the silage from a press roll having spirally located teeth about the outer periphery of the roll. Feed stock is fed into a hopper where it is forced by a reciprocating member into the press roll whose teeth force the feed stock into the storage bag. A gate is held against the closed end of the storage bag with cables connected therefrom to a drum on the apparatus, which drum has a brake arrangment applying tension to the cables so that as the storage bag is filled the brake will release the cable and the apparatus will move away from the gate.

A modifcation of the Egenmuller et al '068 patent is disclosed in U.S. Pat. No. 4,337,805 to Johnson et al wherein substantially the same apparatus is provided except that the pass roll has randomly located groups of teeth, each group having four teeth, about the periphery thereof for forcing the feed stock into a truncated triangular tunnel (as sectioned transverse to the direction of movement of the feed stock) and then into the storage bag. A feeder roll is rotated in the bottom of a feed hopper to advance the feed stock into the press roll. A disc brake arrangement is used to add the resistance to the cable on the drum so as to pay out the cable as the storage bag if filled. A sprocket drive arrangement is employed to drive both the feeder roll and the press roll.

In both of the prior art apparatus described above the press roll is mounted in bearings on opposite sides of the housing and, due to the nature of the wear on the parts of the press roll, must be frequently replaced which necessitates almost completely disassembling the apparatus to remove and replace the press roll. The spirally located single teeth of Eggenmuller '068 and the randomly located groups of teeth of Johnson et al both create unusually heavy loads on the drive apparatus for the feed roller and must be operated at relatively low speeds to avoid clogging or jamming thereof. Eggenmuller et al '068 requires a reciprocating feeder in the hopper where Johnson et al '805 requires a power driven feeder roll to feed the material from the hopper into the feed roller. In both cases the added movable parts of the reciprocating member or of the feeder roll takes power to operate and provides additional apparatus for potential failure and service. In both prior devices the material had to be fed evenly across the full width of the apparatus otherwise the bag was filled unevenly causing pockets and spoilage.

Both Eggenmuller et al '068 and Johnson et al '805 require brake operating cables connected to a gate at the closed end of the bag so that when the braking force is exceeded by the pressed material in the bag, the apparatus will move relative to the gate on the end of the bag. The cables frequently rub the sides of the bag causing bag punctures. It is difficult to rewind the cable in a single layer on the drum. The bag must be kept absolutely straight or the cable will cut into the curved side of the bag and puncture the bag.

The present invention is directed to overcoming one or more of the above enumerated problems.

SUMMARY OF THE INVENTION

In accordance with the improvements of the present invention, an apparatus is provided having a housing mounted on a chassis supported on two wheels. The housing includes a hopper, a passageway and a tunnel. The hopper receiving feed stock and advancing it directly into a press rotor in the passageway with the rotor having pairs of spaced teeth about the periphery thereof. Clean out bars extend from the housing into the open area between the spaced teeth to strip the feed stock from the teeth as the feed stock is forced through the more rectangularly (in cross-section) shaped tunnel into the collapsible storage bag carried by a molding channel portion of the tunnel.

A power source drives the rotor at relatively high speeds. Portions of the drive are immersed in oil for cooling and lubrication. Flanges are provided on the rotor within the confines of the passageway of the housing so that the toothed portion of the rotor can be removed and replaced or repaired without major disassembly of the housing. The tunnel is specially shaped and includes side and back walls diverging from the passageway whereby a relatively short rotor with the pairs of teeth and driven at a relatively high speed expands the feed stock in all directions as it leaves the rotor area. The feed stock is advanced rapidly through the shaped and extended tunnel for guiding and packing the feed stock into the bag with minimal air pockets in the feed stock.

Brakes are provided on the wheels and are set at a predetermined loading so that as the bag is filled, the brake force is overcome and the apparatus is moved forward relative to the bag. Appropriate conveying apparatus is provided for the hopper to convey material directly into the hopper.

The improved apparatus runs at a higher rate of speed so as to fill the bag more rapidly and without air pockets. The apparatus has a readily replaceable rotor to reduce down time for substituting different rotors, for service and for repair of the rotor. The apparatus eliminates the cable drum and cables for applying a load to the material in the bag thereby eliminating the problem of the cable puncturing the bag during filling. the teeth on the rotor are in pairs whereby the rotor can be run faster without clogging and without overloading of the drive, resulting in a lower operating cost. The loaded bag has substantially no air pockets thereby reducing spoilage while storing more feed stock in each bag.

DESCRIPTION OF THE PREFERRED EMBODIMENT

Figures 1, 2, 3, 4, 5:
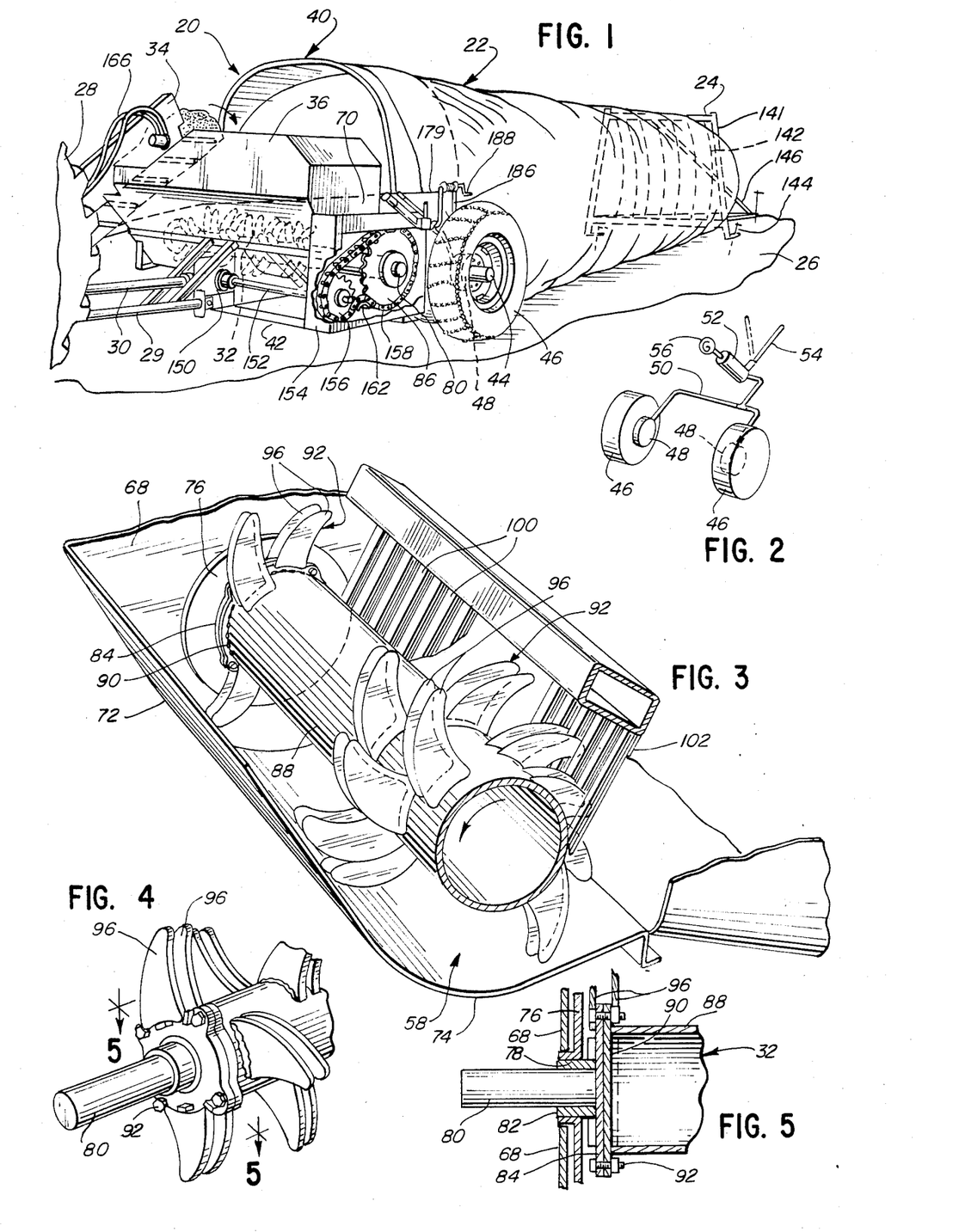
FIG. 1 is a perspective view of the bag loading apparatus of the present invention with an agricultural bag in operative position thereon.
FIG. 2 is a broken away perspective view of a wheel brake arrangement for use on the bag loading apparatus of FIG. 1.
FIG. 3 is an enlarged broken away perspective view of a portion of the hopper and passageway of the housing with an improved rotor in the passageway.
FIG. 4 is a perspective view of one end of the rotor showing the flange connection between the rotor and the mounting shaft.
FIG. 5 is a partial cross-sectional view taken along the lines 5—5 of FIG. 4.

Referring now to the drawings, and in particular FIG. 1, a feed stock compacting and loading apparatus 20 is shown connected to a partially filled silage receptacle or bag 22 supported at one end by a back stop 24 staked and supported by props on the ground 26. The backstop may be in the form of a blank wall or the end of another bag 22. A tractor, only one wheel 28 of which is shown, is connected through a tongue 29 and power takeoff 30 to the compacting apparatus 20. The power takeoff 30 serves to drive a rotor 32 while the tongue 29 connects the apparatus to the tractor for use in moving the apparatus or for use in transmitting movement of the apparatus to the tractor. Feed stock such as corn, hay, alfalfa, and the like is fed to a self-contained conveyor 34 which, in the illustrated form, feeds the feed stock from the side of the apparatus in to a hopper 36, which hopper is part of a housing 40 of the compacting apparatus 20.

Referring more in detail to the conveying apparatus 20, the apparatus comprises a housing 40 affixed on a frame or chassis 42, which is supported by wheels 46 mounted on stub axles 44 extending sidewardly from the opposite sides of said frame. Wheel brakes 48 are operatively associated with each wheel and as shown in FIG. 2, the brakes are connected for actuation through conduits 50 connected to a hydraulic pump 52 mounted on the frame adjacent one of the two wheels. In FIG. 1 the pump 52 is mounted to the frame just inside the wheel 46 on the right side of the apparatus. A handle 54 is pivotally mounted on the hydraulic pump 52 which when actuated, loads the brakes to a predetermined setting as determined by a reading on the gauge 56 connected to the hydraulic pump.

Figure 6:
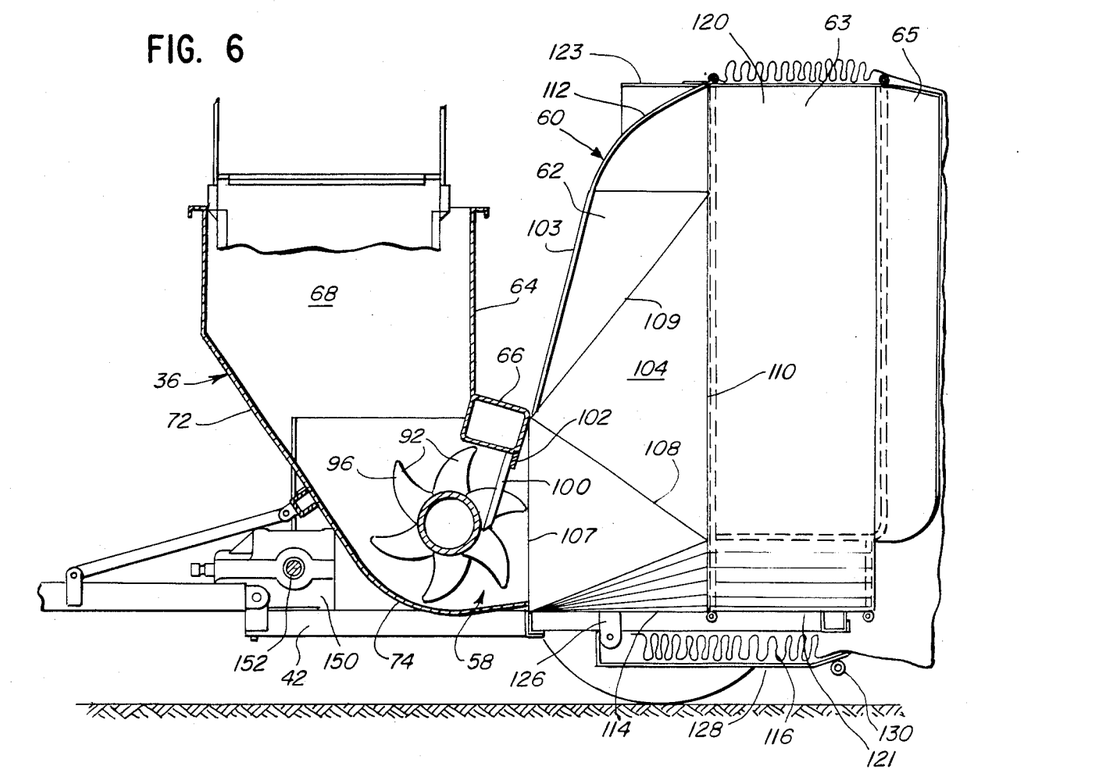
FIG. 6 is a side partial cross sectional view of the bag loading apparatus of FIG. 1.
Figure 7:
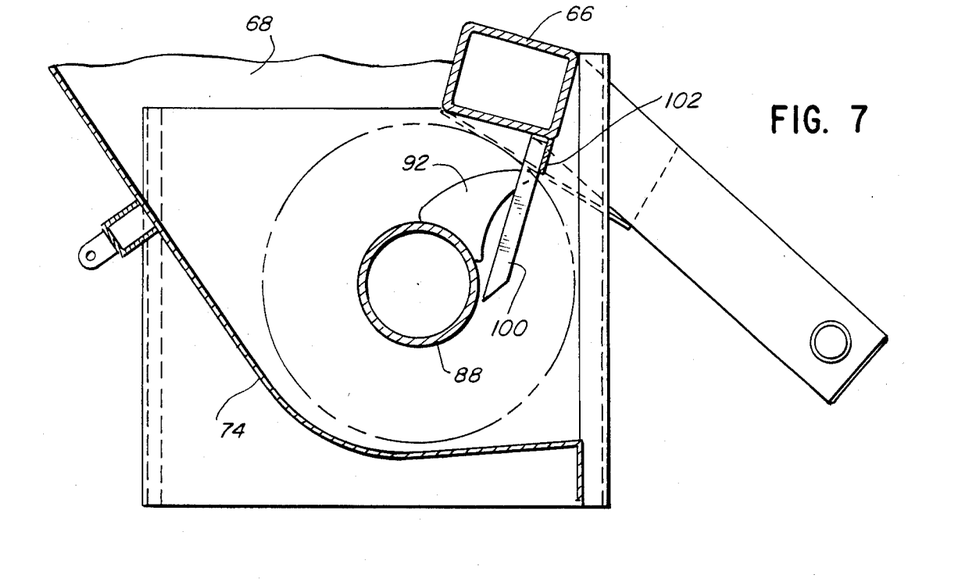
FIG. 7 is an enlarged partial cross sectional view showing the relationship between the rotor and the clean out bars.

The housing 40 is comprised of the hopper 36 connected to a passageway 58 which opens into a tunnel 60, all supported on the chassis or frame 42. The hopper 36 has a front wall 64 connected to a cross beam 66 on the frame 42, has side walls 68 and 70 and a rear wall 72. The rear wall is sloped and is tangent to the curved bottom wall 74 of the passageway 58. As can be seen in FIGS. 6 and 7, the bottom wall 74 curves slightly upwardly forward of the axis of the rotor and terminates at the entrance to the tunnel 60 which results in a short fall off from the bottom wall 74 of the passageway to the bottom wall of the tunnel 60. The side walls 68,70 close the ends of the hopper and the ends of the passageway and, in the passageway (FIG. 3), have reinforcing bearing plates 76 affixed thereto with an aperture 78 therethrough through which a stub shaft 80 and a bearing sleeve 82 extend (FIG. 5). The bearing sleeve 82 on each end of the rotor is positioned around the shaft 80 and is welded to a flange 84 disposed on the inside of the each wall 68,70, respectively, of the passageway 58. The stub shaft 80 on the left end of the passageway extends freely through the bearing plate 76 and wall 68 and in the present form has no additional elements affixed thereto. The stub shaft 80 on the right side of the passageway extends through the bearing plate 76 and wall 70 and has a sprocket wheel 86 rigidly attached thereto exterior of the passageway 58. Between the flanges 84 is affixed a tube 88 of the rotor 32 with the tube having flanges 90 welded on either end thereof. Bolts and nuts 92 pass through lugs on the flanges 84 and 90 for affixing the rotor 32 to the stub shafts 80. The hopper is constructed to feed the feed stock by gravity directly into the passageway 58 and rotor.

Affixed around the periphery of the tube 88 are a plurality of pairs 92 of knives or teeth 96 which teeth have a concave surface on the trailing edge thereof and a convex surface on the leading edge thereof. Each tooth 96 of a pair of teeth is spaced from the other tooth 96 of the pair a preset amount. In the illustrated form of the invention, the pair 96 of teeth on one side of the tube 88 are diametrically opposite a similar pair of teeth on the opposite side of the tube. It is to be understood that the teeth do not have to be diametrically opposite each other, although there is some advantage thereto. One tooth 96 of one pair 92 of teeth lies in a plane transverse to the axis of the tube and is spaced from the plane of the adjacent but circumferentially displaced tooth of the next axially located pair of teeth by an amount equal to the spacing between the two teeth of each pair of teeth. The teeth all lie in planes that are transverse to the axis of the tube and which planes are all equally spaced apart along the axis of the tube. The pairs 92 of teeth are in rows, with the axes of the rows parallel to each other and parallel to the axis of the rotor. In the illustrated form, there are a total of six rows of pairs of teeth, with the axis of each row being spaced approximately 60° from the axis of the adjacent row so that, as can be seen in FIG. 6 from the end of the rotor, there are six equally spaced rows of teeth about the periphery of the rotor. As illustrated, there are 30 pairs of teeth equalling 60 teeth on the rotor but more or less number of pairs and number of teeth may be provided depending on the feed stock being stored and the speed and horsepower of the source of power being used to drive the system. As an example, the owner may find it necessary to change tractors while filing a bag. If he is going to less horsepower, he can install a rotor with fewer pairs of teeth 96 and resume bagging with minimal loss of time. Substituting a larger tractor will dictate using a rotor with more teeth.

As can be seen in FIGS. 3 and 4, diametrically opposite teeth 96 are secured as by welding to the shaft 80 side of the flanges 88 with mating teeth 96 secured to the inner sides of the flanges 90 and the tube 88. The result is pairs of teeth spanning the flanges 84,90 with the spacing between the teeth of each pair equaling the space between the teeth 96 of all other pairs. By having the pairs 92 of teeth 96 on the flanges on the ends of the rotor 32 eliminates a problem area in the prior art where feed stock was not processed by the rotor at the ends of the rotor resulting in bunching up of feed stock and/or less than adequate flow of feed stock resulting in air pockets on the sides of the bag. In addition, the prior art devices required more time to fill the bag.

The cross beam 66 of the frame 42 between the hopper 36 and tunnel 60 has a plurality of equally spaced apart clean out bars or prongs 100 projecting downwardly and slightly rearwardly therefrom into alignment with the space between the pairs of knives or teeth 96 on the rotor 32. The bars or prongs 100 are welded to the underside of the box shaped cross beam 66 with a protective plate 102 projecting down over the junction between the prongs 100 and the cross beam 66 so as to provide a slight overhanging wall between adjacent prongs and to support the prongs in proper alignment between the pairs of teeth. The leading edge of each bar or prong 100 terminates in closely spaced relation to the outer surface of the tube 88 and is located slightly forward of the front face of the tube 88. As the rotor 32 rotates, the pairs of teeth sweep past the adjacent prongs 100 with a prong extending between each pair of teeth to sweep the feed stock from the teeth of the rotor. The plate 102 is in close proximity to the path of the knives or teeth 96 as they sweep past the plate, helping to clear the feed stock from the rotor and to keep it clean. The bars or prongs 100 and plate 102 align with the back wall 103 of the tunnel 60 for a purpose to be explained hereinafter.

Figure 8:
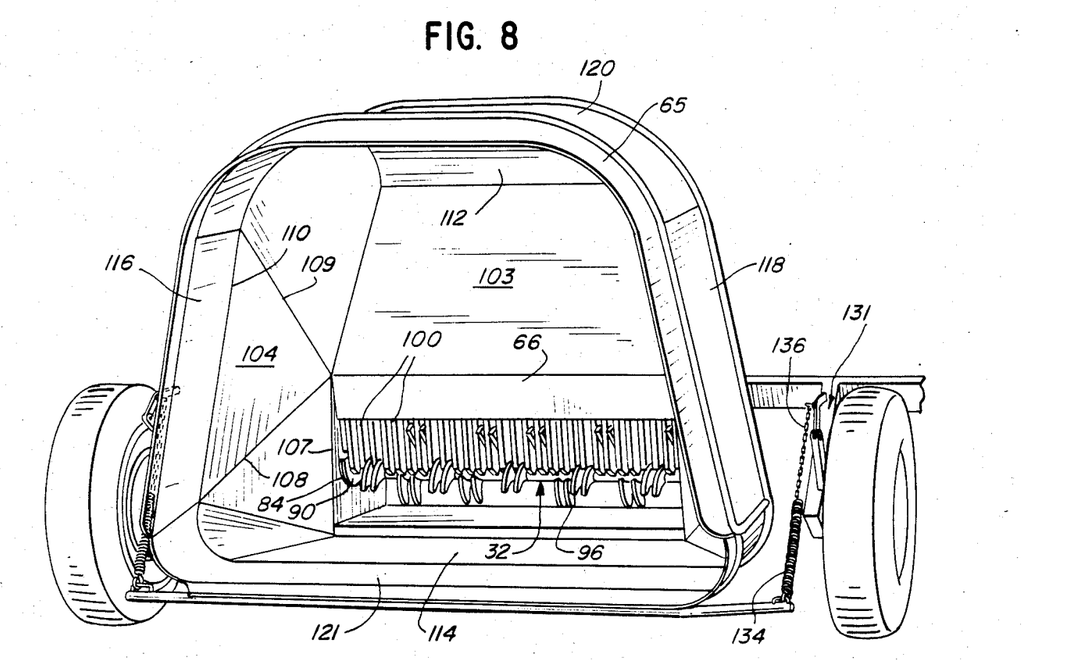
FIG. 8 is a perspective view of the front portion of the housing of the apparatus.

The tunnel 60 is made up of an expanding chamber 62, a forming chamber 63 and a guide portion 65. The expanding chamber 62 has an upwardly sloping back wall 103 with diverging side walls 104 and 106 connected to the outlet or mouth 107 of the passageway 58. The back wall 103 forms an angle of approximately 88° with the longitudinal axis of the apparatus and aligns smoothly with the front face of the cross beam 66. The back wall 103 and the side walls 104,106 merge into a short arcuate shaped top wall 112. A bottom wall 114 is supported on the frame and is attached to the bottom edge of the passageway 58. The respective side edges of the bottom 114 are shaped gradually into a connection with the side walls 104 and 106. The leading edge 110 of the expanding chamber 62 joins into the forming chamber 63 which has side walls 116,118 which slope gradually upwardly and inwardly as they approach the upper portions of the side walls and form into a dome-shaped top wall 120. The cross-section of the forming chamber 63 transverse to the direction of flow of the feed stock approaches a rectangle with the short side walls 116,118 sloping slightly inwardly and with the top wall bowed slightly upwardly in the midportion. As best seen in FIG. 8, the forming chamber 63 has curved side corners as it merges into a flat bottom wall 121 which is in alignment with the bottom wall 114 of the chamber 62.

Figure 10:
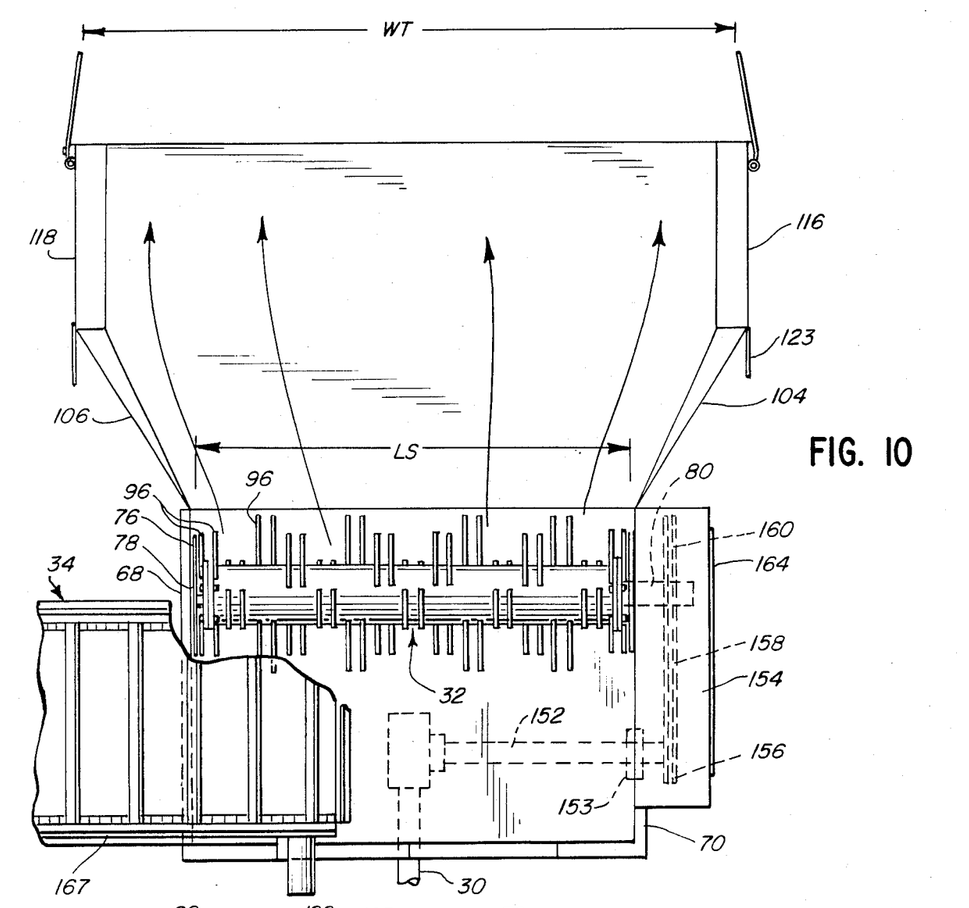
FIG. 10 is a broken away plan view of the bag loading apparatus of FIG. 1.
Figures 11, 12:
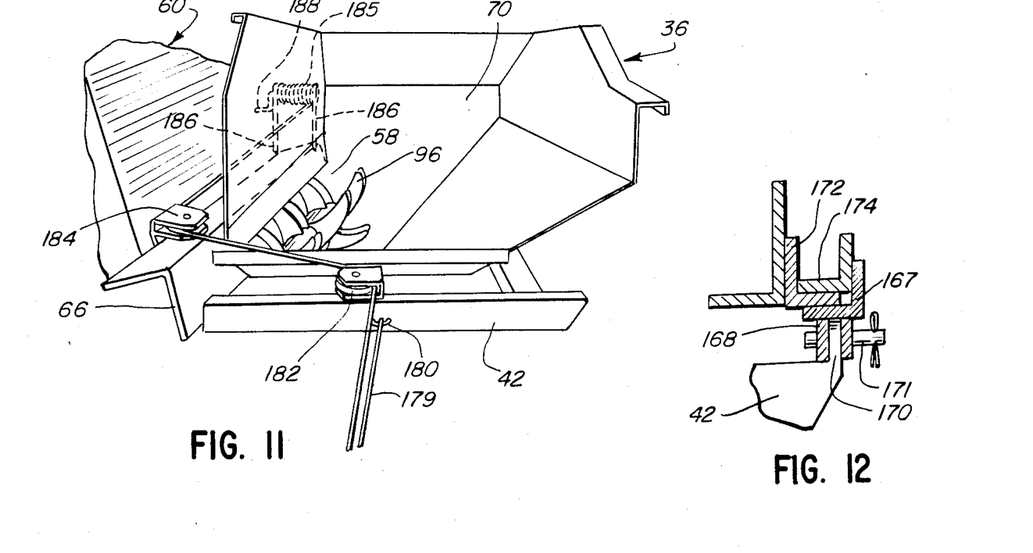
FIG. 11 is a partial broken away side perspective view of the actuating cable for the feed stock conveyor.
FIG. 12 is a broken away cross sectional view of the pivot for the feed stock conveyor as mounted to the frame of the housing.

Beginning at points just above the curved corners of the forming chamber 63 is a guide portion 65 which extends from the lower reaches of the two side walls 116,118, and follows the contour of the side walls up through and over the dome-shaped top wall. As shown in FIGS. 7 and 10, the guide 65 is sloped slightly inwardly toward the axis of the apparatus which tends to compact the feed stock as the feed stock exits the tunnel 60. The agricultural bag 22 is puckered, pleated or bunched so that initially it is relatively short in longitudinal dimension. With the pleating threaded over the outer surfaces of the forming chamber 63 and guide 65 of the tunnel 60. An extension 123 is connected to the rear edge of the outside of the forming chamber 63 to provide added support for the full extent of the bunched up bag 22. The rear edges of the agricultural bag is resiliently secured to the tunnel 60 and extension 123 by means well known in the art.

Figure 9:
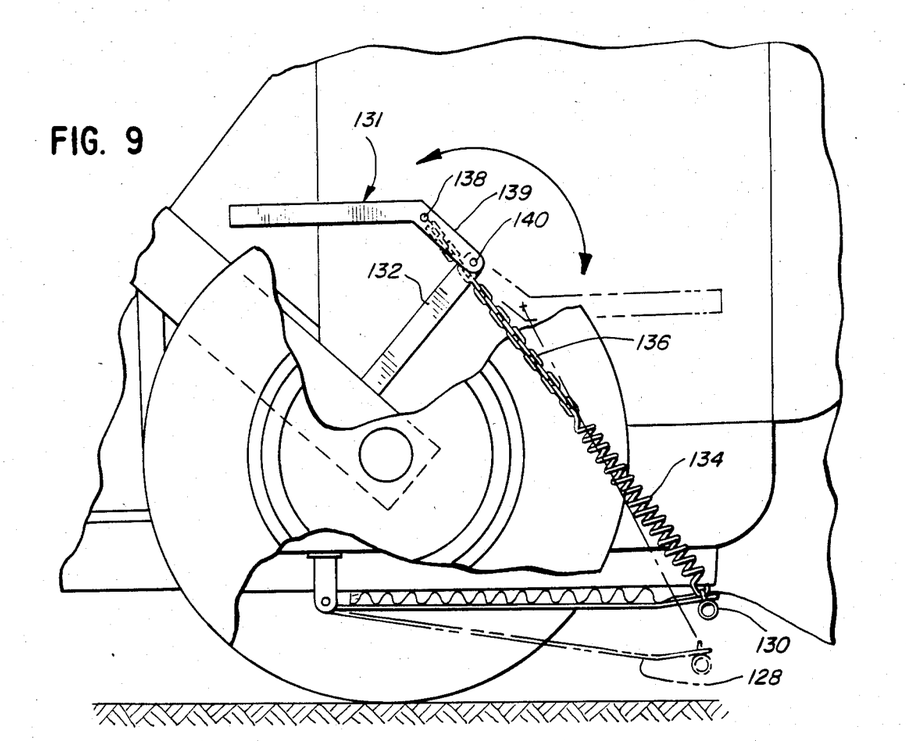
FIG. 9 is an enlarged broken away partial view of the bag mounting mechanism as mounted on the housing.

Pivotally mounted on spaced lugs 126 extending downwardly from the bottom wall 114 of the tunnel 60 is a support pan 128 which fits below the pleats in the bag 22 and supports and retains the bag 22 on the tunnel 60. A crossbar 130 is secured to the forward edge of the supporting pan 128 with the outer ends thereof extending beyond the edges of the pan 128. An overcenter actuator 131 is pivoted to support arms 132 attached to the frame 42 on opposite sides of the tunnel 60. Each actuator has a spring 134 connected to the cross bar and connected through a chain 136 to a pivot 138 on an angled handle 139 which handle is pivoted at 140 to the support 132. As can be seen in FIG. 9, when the lever 134 is pivoted forward to the dotted line position, the supporting pan 128 is lowered so that an agricultural bag 22 can be threaded over the guide 65, shaping portion 63 and extension 123 of the tunnel. With the lever 134 pivoted to the solid line rearwardly extending position of FIG. 9, the spring is in tension and pulls the pan resiliently against the lower portion of the pleated bag to resiliently support the bag on the tunnel 60.

In practice, when a new bag 22 is assembled with the apparatus by threading the open portion of the bag over the shaping portion 63 of the tunnel, the closed end of the bag will be in close proximity to the mouth of the guide 65. Pivoting the actuator 131 into the tensioning position of the spring, will resiliently support the bag on the tunnel. Prior to starting the bag loading operation, a gate 24, which is comprised of a frame 141 supporting resiliently interlaced straps or netting 142 therebetween, may be staked to the ground using stakes 144, a prop or brace 146 extends into engagement with the top crossbar of the gate and is likewise staked to the ground so as to support the gate in an upright position in close proximity to the closed end of the agricultural bag 22. The bag may be backed by a wall or by the closed end of an already filled bag.

The power take-off 30 from the tractor is connected into a gear box 150 mounted on the frame 42 of the housing. The gear box is conventional and has a gear ratio of 3:1 and drives an output shaft 152 extending from the gear box through appropriate bearing and seal 153 into a reservoir 154 mounted on the side wall 70 of the hopper. A sprocket 156 is keyed to the outer end of the shaft 152 and drives a chain 158 which in turn drives the sprocket 86 keyed on the outer end of the stub shaft 80 of the rotor 32. A chain guide 162 is mounted intermediate the sprockets 156,86 to control the tension and to increase the driving contact between the chains and the sprockets. The reservoir 154 has an inspection and filling panel 164 on the side thereof which permits access to the sprockets and the chain. The level of oil is maintained in the reservoir sufficient to submerse parts of the sprockets 156,86 and the chain 158 so as to provide lubrication thereto and to afford a degree of cooling of the parts. The relative size of the sprockets 156,86 is such as to provide a further 3:1 gear reduction between the input shaft 152 and the rotor 32. The effect of the gear box and sprockets is to reduce the speed of the power take-off 30 approximately 9:1 in driving the rotor 32 resulting in a speed of approximately 60 revolutions per minute when the power take-off runs at 540 rpm. The speed of the rotor can be controlled within the range of 40 to 80 revolutions per minute. Prior systems reduced the speed from the power take-off to the rotor so that the rotor was driven at approximately 30 revolutions per minute and within the range of 28 to 36 revolutions per minute.

Different systems can be employed to feed the feed stock into the hopper 36. In the illustrated embodiment, a conveyor 34 is pivotally and slidably attached to the frame 42 and hopper 36 of the apparatus so that in operating position the flight of the conveyor will convey material dumped into the input end and move the material up the conveyor and into the open top of the hopper 36. The conveyor may be driven by a hydraulic motor powered through hydraulic fluid from the tractor through the conduits 166 extending from the tractor. The frame 167 of the conveyor 34 is pivoted on the frame 42 of the apparatus by means of the trunnions 168 of the frame 167 and the lugs 170 on the frame 42. A pin 171 passes through the aligned openings in the trunnions and lug so that the conveyor may be pivoted from one position to another as required. The conveying portion of the conveyor is mounted on a structure 172 that can slide in tracks 174 on the frame 167 relative to the hopper of the apparatus. A cable 179 is secured to the frame 42 at 180, passes through a pulley (not shown) on the undersurface of the structure 172 for the conveyor, doubles back and passes around a pulley 182 on the frame 42 and traverses a path around a pulley 184 located in the cross beam 66 and passes between the hopper 36 and the tunnel 60 with the cable passing around a drum 185 supported between a pair of supports 186 on the frame of the apparatus. A crank 188 and latching arrangement are provided on the drum whereby releasing the latching and turning the crank will slide the conveyor 34 from a general engaging position into a position substantially overlapping the hopper with the input end of the conveyor raised off the ground by an amount that will permit easy transport of the apparatus without dragging the conveyor on the ground.

In a typical loading apparatus, the length of the passageway (side to side) is approximately 60" which feeds into the tunnel 60 having the expanding section 62 expanding the opening to 100" width. The expanding chamber 62 has its back wall rising at an angle of approximately 88° with the longitudinal axis of the apparatus which back wall merges into a small radius curvature at the top. The dome shaped top is wider and flatter, side to side than prior tunnels that had a tendency to be more triangular in cross-section (narrow at the top). The forming chamber matches the cross section of the leading edge of the expanding chamber. The distance from the leading edge of the passageway to the leading edge of the forming chamber is approximately 24" which when added to the 12" guide 65 makes approximately 36" back to front and with a wider and flatter dome-shaped top produced more uniform compaction of the feed stock and substantially eliminated the lumps and air pockets prevalent in the prior art short rear to front tunnel. The longer tunnel with the substantially straight back wall and longer shaping member 63 allows the feed stock exiting the rotor to fully fill the expanding chamber 62 and the shaping chamber 63 throughout the full cross section before it enters the bag. Initially, the tunnel and bag end fill up completely whereupon pressure from the feed stock forced into the tunnel develops in the tunnel which builds up until the brake force on the wheels 46 is overcome whereupon the loading apparatus is inched rearward. The rearward movement of the loading apparatus causes the tunnel to move rearward of the feed stock that has filled the tunnel and the end of the bag with a new portion of the bag being pulled off the outer surface of the tunnel and encasing the shaped and compacted mass of feed stock. The new front to rear expanding shaping and guiding portions of the tunnel contribute substantially to the improved results.

The devices such as made under the Johnson et al U.S. Pat. No. 4,337,805 had a substantially circular rear wall and only about a 6" horizontal top which did not permit the feed stock to fully compact and fill up the tunnel before it entered the bag. The feed stock had to be uniformly fed into the beater bars and rotor to get any degree of uniformity to the mass of feed stock being forced into the bag. Frequently, air pockets developed resulting in heat (due to the organic nature of the feed stock) which caused the feed stock to decompose. Absent the air pockets, as now provided by the improved apparatus, reduces or eliminates heat since there is no source of oxygen to encourage a chemical reaction. No heat, no Butyric acid formation (spoilage) and no vitamin A loss.

The shorter rotor 32 (60") with the pairs 92 of teeth 96 means that less feed stock is grabbed by each pair and moved through the passageway 58. The less material grabbed the less work required to move it. The rotor in the improved apparatus is run faster (70 rpm vs. 30 rpm) and since it is shorter in length (66" vs. 100") it requires less horse power. The prior art loading apparatus required 70-120 horsepower to drive the 100" rotor at 28 to 36 rpm. The improved apparatus requires on the low side of 60-100 horsepower to achieve the same loading capacity as the prior art. The lower required horsepower saves fuel and costs. The pairing of the teeth or knives 96 works on smaller quantities of material at a faster rate to save power while at the same time providing a better bagged feed product with less chance of spoilage. The higher speeds reduces component wear and stress considerably thus increasing the life of the parts while decreasing maintenance and down time expense. In practice it has been found that more or less numbers of pairs of teeth can be provided on the rotor for use with particular types of feed stock. For instance, if the number of pairs of teeth are doubled from 30 pairs of 60 pairs the mixing action and capacity is twice what it was before.

With the higher rpm (60 vs. 30), the velocity of the teeth is almost twice as fast, thus striking the material almost twice as hard. The greater impact flattens the material even more which not only enhances the compaction but quite probably increases the tonnage forced into a bag as the flattened material requires less space.

I claim:

1. In an apparatus for loading feed stock into agricultural bags having a housing with a hopper, a passageway and a tunnel, an agricultural bag expandably affixed to said tunnel and having a closed end closing the mouth of the tunnel, a rotor rotatably mounted in said passageway, means for driving said rotor to move feed stock from the hopper through the passageway and into the tunnel and brake means for resisting relative movement between the loading apparatus and the closed end of the bag, the improvement comprising:

said tunnel having an expanded chamber comprised of a horizontal bottom wall, side walls diverging from said passageway and a back wall;

a forming chamber having an inlet end and an outlet end, joining with the expanding chamber and extending forwardly thereof, the cross-section of said forming chamber remaining uniform from the inlet end to the outlet end; and a guide means joining with a leading edge of the forming chamber and converging inwardly whereby the rotor will force feed stock into the tunnel to completely fill the tunnel and the closed end of the bag, the pressure of the feed stock forced into the filled tunnel overcoming the loading on the brake means to urge the loading apparatus rearward as the rotor maintains the tunnel and the bag filled.

2. The apparatus as claimed in claim 1 wherein said rotor has a plurality of pairs of teeth formed on the periphery of said rotor, each pair of teeth being offset circumferentially from the next adjacent pair of teeth with the axial space between the teeth of one pair and the adjacent pair being equal to the spacing between each tooth of a pair of teeth;

a cross beam on the housing;

prongs carried by the cross beam and extending between each pair of teeth and each adjacent pairs of teeth for stripping feed stock from the teeth of the rotor; and a plate affixed to the forward face of the cross beam and overhanging between adjacent prongs, said plate cleaning feed stock from the teeth and guiding the feed stock along a planar path aligned with the back wall of the tunnel for guiding the feed stock into the expanding chamber of the tunnel.

3. In the loading apparatus of claim 1 wherein a pair of wheels are operatively connected with said housing for supporting said housing on the ground, said brake means operatively connected with said wheels and means for applying a predetermined force to said brake means whereby a predetermined load against the front of the housing by a build-up of feed stock in the agricultural bag will move the housing away from the closed end of the bag while maintaining the pressure of the material in the bag.

4. In the loading apparatus of claim 1 wherein conveying means are carried by the housing along a line transverse to the longitudinal axis of the housing, means for driving the conveying means for moving the feed stock delivered to the conveying means into the receiving hopper and means for raising and lowering the conveying means relative to the housing during transport of the loading apparatus from one location to another.

5. In an apparatus for loading feed stock into agricultural bags having a housing with a hopper, a passageway and a tunnel, an agricultural bag expandably affixed to said tunnel and having a closed end closing the mouth of the tunnel, a rotor rotatably mounted in said passageway, means for driving said rotor to move feed stock from the hopper through the passageway and into the tunnel and brake means for resisting relative movement between the loading apparatus and the closed end of the bag, the improvement comprising said tunnel having an expanding chamber comprised of a horizontal bottom wall, side walls diverging from said passageway and a back wall forming an angle slightly less than 90° with the longitudinal axis of the apparatus;

a forming chamber having an inlet end and outlet end joining with a leading edge of the expanding chamber and extending forwardly an amount substantially equal to the longitudinal extent of the expanding chamber, the cross-section of said forming chamber remaining uniform from the inlet end to the outlet end; and a guide means joining with a leading edge of the forming chamber and converging inwardly along a top portion and along the side portions thereof whereby initially the rotor will force feed stock into the tunnel to completely fill the tunnel and the closed end of the bag and thereafter the pressure of the feed stock forced into the filled tunnel will overcome the loading on the brake means to urge the loading apparatus rearward as the motor maintains the tunnel filled, the expanding chamber accepting newly treated feed stock as the forming chamber shapes the mass of feed stock and the guide means compacting the formed mass as the loading apparatus moves away from the filled end of the bag.

6. In a loading apparatus for loading feed stock into agricultural bags comprising:

a housing having a feed stock receiving hopper, a passageway communicating with the hopper and a tunnel communicating with the passageway, said tunnel supporting the open mouth of an agricultural bag to be filled, the improvement comprising a rotor extending across the width of the passageway;

pairs of teeth radially mounted on the periphery of the rotor with axially adjacent pairs of teeth being offset circumferentially on the surface of the rotor;

a cross beam on the housing;

a plurality of prongs fastened to the undersurface of the cross beam with each prong extending between a pair of teeth and between the adjacent teeth of adjacent pairs of teeth;

a radially extending flange on each end of the rotor;

a pair of stub shafts extending through the walls of the passageway and having a mating flange carried by the inner end of each shaft; and means for securing the flanges on the rotor to the flanges on the stub shafts within the passageway whereby said rotor can be removed and serviced without removing the stub shafts from the housing.

7. In a loading apparatus as claimed in claim 6 wherein a plate is attached to a forward wall of the cross beam and to the prongs, said plate overhanging between adjacent prongs.

8. In a loading apparatus as claimed in claim 6 wherein each flange on the rotor has at least one radially extending tooth affixed thereto;

at least one tooth affixed to the flanges on the stub shafts, said tooth affixed to the flange on the rotor mating with the tooth affixed to the flange on the stub shaft to form a pair of teeth, the spacing between the pair of teeth on the flanges being equal to the spacing between the teeth of the other pairs of teeth on the rotor.

9. In the loading apparatus of claim 6 wherein a sprocket is mounted on one of the stub shafts exterior of the passageway;
a second sprocket;
a gear reduction structure having an output operatively connected with said second sprocket;
means connecting said sprockets together;
means for driving the gear reduction structure and the sprockets for driving the rotor at speeds in the range of 50-80 rpm; and
a reservoir carried by the side wall of the passageway and hopper and enclosing said sprockets; and
fluid in said reservoir for lubricating said sprockets.

10. In the loading apparatus of claim 6 wherein a pair of wheels are operatively connected with said housing for supporting said housing on the ground;
means operatively connected with said wheels for braking the wheels; and
means for applying a predetermined force to said brake means whereby a build-up of pressure of feed stock between the agricultural bag and the tunnel will move the apparatus away from the closed end of the bag while maintaining the pressure of the material in the bag.

11. In the loading apparatus of claim 6 wherein conveying means are carried by the housing for feeding feed stock to the hopper,
means for driving the conveyor for moving the feed stock into the hopper; and
means for raising the conveyor relative to the housing during transport of the loading apparatus from one location to another.

12. An apparatus for loading feed stock into agricultural bags having a housing with a hopper, a passageway and a tunnel;
an agricultural bag expandably affixed to said tunnel and having a closed end closing the mouth of the tunnel;
a rotor rotatably mounted in said passageway, the width of said rotor being approximately equal to two-thirds the width of said tunnel;
means for driving said rotor to move feed stock from the hopper through the passageway and into the tunnel;
said tunnel having an expanding chamber comprised of a horizontal bottom wall, side walls diverging from said passageway and a substantially vertically extending back wall;
a forming chamber having an inlet end and an outlet end joining with a leading edge of the expanding chamber, the cross-section of said forming chamber remaining uniform from the inlet end of the outlet end;
guide means joining with a leading edge of the forming chamber and converging inwardly along a top portion and along the side portions thereof;
a pair of wheels supporting the apparatus on the ground;
brake means on the wheels for resisting relative movement between the loading apparatus and the closed end of the bag;
pairs of teeth mounted on the periphery of the rotor with axially adjacent pairs of teeth being offset circumferentially;
a cross beam on the housing;
a plurality of prongs fastened to the undersurface of a cross beam of the housing with each prong extending between a pair of teeth and between the adjacent teeth of adjacent pairs of teeth;
a pair of stub shafts;
a radially extending flange at each end of the rotor, a mating flange on the inner end of each stub shaft of the pair of stub shafts, each stub shaft extending through the side walls of the passageway; and
means for securing the flanges on the rotor to the flanges on the stub shafts within the passageway whereby the rotor can be removed and replaced without removing the stub shafts from the housing.

13. In a loading apparatus as claimed in claim 12 wherein each flange on the rotor has at least one radially extending tooth affixed thereto; and
at least one tooth affixed to the flanges on the stub shafts, said tooth affixed to the flange on the rotor mating with the tooth affixed to the flange on the stub shaft to form pairs of teeth on the end of the rotor.

14. In the loading apparatus of claim 12 wherein a first sprocket is provided on one of the stub shafts exterior of the passageway, means operatively connecting said first sprocket with a second sprocket on an output shaft of a gear reduction structure;
means for driving the gear reduction structure and the rotor;
a reservoir carried by the passageway and hopper and enclosing said first and second sprockets; and
fluid in said reservoir for lubricating said first and second sprockets.

15. In the loading apparatus of claim 12 wherein conveying means are carried by the hopper;
means for driving the conveyor for moving the feed stock into the hopper; and
means for raising the conveyor relative to the housing during transport of the loading apparatus from one location to another.

16. In an apparatus for loading feed stock into agricultural bags having a housing with a hopper, a passageway and a tunnel, an agricultural bag expandably affixed to said tunnel and having a closed end closing the mouth of the tunnel, a rotor rotatably mounted in said passageway, means for driving said rotor to move feed stock from the hopper through the passageway and into the tunnel and brake means for resisting relative movement between the loading apparatus and the closed end of the bag, the improvement comprising:
said tunnel having an expanding chamber comprised of a horizontal bottom wall, side walls diverging from said passageway and a back wall;
a forming chamber having an inlet end and an outlet end, the outlet end joining with the expanding chamber and extending forwardly thereof, the cross-section of said forming chamber remaining substantially uniform from the inlet end to the outlet end;
said rotor has a plurality of pairs of teeth formed on the periphery of said rotor, each pair of teeth being offset circumferentially from the next adjacent pair of teeth and with the axial space between the teeth of one pair and the adjacent pair being equal to the spacing between each tooth of a pair of teeth; whereby the rotor will force feed stock into the tunnel to completely fill the tunnel and the closed end of the bag, the pressure of the feed stock forced into the filled tunnel overcoming the loading on the brake means to urge the loading apparatus rearward as the rotor maintains the tunnel and the bag filled.

17. In the loading apparatus of claim 16 wherein a cross beam is mounted on the housing with prongs carried by the cross beam and extending between each pair of teeth and each adjacent pairs of teeth for stripping feed stock from the teeth of the rotor.

18. In the loading apparatus of claim 17 wherein a plate is affixed to the forward face of the cross beam and overhangs between adjacent prongs, said plate cleaning feed stock from the teeth and guiding the feed stock along a planar path aligned with the back wall of the tunnel for guiding the feed stock into the expanding chamber of the tunnel.

19. In the loading apparatus of claim 16 wherein a pair of wheels are operatively connected with said housing for supporting said housing on the ground,
said brake means operatively connected with said wheels and means for applying a predetermined force to said brake means whereby a predetermined load against the front of the housing by a build-up of feed stock in the agricultural bag will move the housing away from the closed end of the bag while maintaining the pressure of the material in the bag.

20. In the loading apparatus of claim 16 wherein conveying means are carried by the housing along a line transverse to the longitudinal axis of the housing, means for driving the conveying means for moving the feed stock delivered to the conveying means into the receiving hopper and means for raising and lowering the conveying means relative to the housing during transport of the loading apparatus from one location to another.

21. In an apparatus for loading feed stock into agricultural bags having a housing with a hopper, a passageway and a tunnel, an agricultural bag expandably affixed to said tunnel and having a closed end closing the mouth of the tunnel, a rotor rotatably mounted in said passageway, means for driving said motor to move feed stock from the hopper through the passageway and into the tunnel and brake means for resisting relative movement between the loading apparatus and the closed end of the bag, the improvement comprising
said tunnel having an expanding chamber comprised of a horizontal bottom wall, side walls diverging from said passageway and a back wall forming an angle slightly less than 90° with the longitudinal axis of the apparatus;
a forming chamber having an inlet end and an outlet end joining with a leading edge of the expanding chamber and extending forwardly an amount substantially equal to the longitudinal extent of the expanding chamber, the cross-section of said forming chamber remaining uniform from the inlet end to the outlet end;
a plurality of teeth formed on said rotor, with selected teeth being displaced circumferentially and axially with respect to adjacent teeth,
a cross beam on the housing; and
prongs affixed to the undersurface of the cross beam and extending into close proximity with the surface of the rotor between adjacent teeth on the rotor, whereby initially the rotor will force feed stock into the tunnel to completely fill the tunnel and the closed end of the bag and thereafter the pressure of the feed stock forced into the filled tunnel will overcome the loading on the brake means to urge the loading apparatus rearward as the rotor maintains the tunnel filled, the expanding chamber accepting newly treated feed stock as the forming chamber shapes the mass of feed stock and as the loading apparatus moves away from the filled end of the bag.

22. In a loading apparatus for loading feed stock into agricultural bags comprising:
a housing having a feed stock receiving hopper, a passageway communicating with the hopper and a tunnel communicating with the passageway, said tunnel supporting the open mouth of an agricultural bag to be filled, the improvement comprising
a rotor extending across the width of the passageway;
pairs of teeth radially mounted on the periphery of the rotor with axially adjacent pairs of teeth being offset circumferentially on the surface of the rotor;
a cross beam on the housing;
a plurality of prongs fastened to the undersurface of the cross beam with each prong extending between a pair of teeth and between the adjacent teeth of adjacent pairs of teeth; and
a radially extending flange on at least one end of the rotor;
a stub shaft extending through the wall of the passageway adjacent said flange and having a mating flange carried by the inner end of said stub shaft; and
means for securing the flange on the rotor to the flange on the stub shaft within the passageway whereby said rotor can be removed and serviced without removing the stub shaft from the housing.

23. In a loading apparatus as claimed in claim 22 wherein a plate extends substantially the width of said passageway and is attached to the prongs in close proximity to a forward wall of the cross beam.

24. In a loading apparatus as claimed in claim 22 wherein said flange on the rotor has at least one radially extending tooth affixed thereto;
at least one tooth affixed to the flange on the stub shaft, said tooth affixed to the flange on the rotor mating with the tooth affixed to the flange on the stub shaft to form a pair of teeth, the spacing between the pair of teeth on the flanges being equal to the spacing between the teeth of the other pairs of teeth on the rotor.

25. In the loading apparatus of claim 22 wherein a sprocket is mounted on one end of the stub shaft exterior of the passageway;
a second sprocket;
a gear reduction structure having an output;
said second sprocket being operatively connected to the output of said gear reduction structure;
means connecting said sprockets together;
means for driving the gear reduction structure and the sprockets for driving the rotor at speeds in the range of 50-80 rpm;
a reservoir carried by the side wall of the passageway and hopper and enclosing said sprockets; and
fluid in said reservoir for lubricating said sprockets.

26. In the loading apparatus of claim 22 wherein a pair of wheels are operatively connected with sad housing for supporting said housing on the ground;
means operatively connected with said wheels for braking the wheels; and
means for applying a predetermined force to said brake means whereby a build-up of pressure of feed stock between the agricultural bag and the tunnel will move the apparatus away from the closed end of the bag while maintaining the pressure of the material in the bag.

27. In the loading apparatus of claim 22 wherein conveying means are carried by the housing for feeding feed stock to the hopper;
   means for driving the conveyor for moving the feed stock into the hopper; and
   means for raising the conveyor relative to the housing during transport of the loading apparatus from one location to another.

28. An apparatus for loading feed stock into agricultural bags having a housing with a hopper, a passageway and a tunnel;
   an agricultural bag expandably affixed to said tunnel and having a closed end closing the mouth of the tunnel;
   a rotor rotatably mounted in said passageway, the width of said rotor being approximately equal to two-thirds the width of said tunnel;
   means for driving said rotor to move feed stock from the hopper through the passageway and into the tunnel;
   said tunnel having an expanding chamber comprised of a horizontal bottom wall, side walls diverging from said passageway and a substantially vertically extending back wall;
   a forming chamber having an inlet end and an outlet end joining with a leading edge of the expanding chamber, the cross-section of said forming chamber remaining uniform from the inlet end to the outlet end;
   a pair of wheels supporting the apparatus on the ground;
   brake means on the wheels for resisting relative movement between the loading apparatus and the closed end of the bag;
   pairs of teeth mounted on the periphery of the rotor with axially adjacent pairs of teeth being offset circumferentially;
   a plurality of prongs fastened to the undersurface of the cross beam of the housing with each prong extending between a pair of teeth and between the adjacent teeth of adjacent pairs of teeth;
   a pair of stub shafts;
   a radially extending flange on at least one end of the rotor;
   a mating flange on the inner end of at least one of said stub shafts, said stub shaft with the flange extending through the side wall of the passageway with the flange adjacent the flange on the rotor; and
   means for securing the flange on the rotor to the flange on the stub shaft within the passageway whereby the rotor can be removed and replaced without removing the stub shaft from the housing.

29. In a loading apparatus as claimed in claim 28 wherein said flange on the rotor has at least one radially extending tooth affixed thereto; and
   at least one tooth affixed to the adjacent flange on the stub shaft, said tooth affixed to the flange on the rotor mating with the tooth affixed to the flange on the stub shaft to form a pair of teeth on the one end of the rotor.

30. In a loading apparatus as claimed in claim 28 wherein said rotor has a radially extending flange on each end thereof; and
   wherein said pair of stub shafts extend through the side walls of the passageway and have mating flanges on the inner end thereof; and
   means for securing the flanges on the rotor to the flanges on the stub shafts.

31. In the loading apparatus of claim 28 wherein a first sprocket is provided on one of said stub shafts exterior of the passageway;
   a second sprocket;
   a gear reduction structure;
   means operatively connecting said first sprocket with said second sprocket on an output shaft of said gear reduction structure;
   means for driving the gear reduction structure and the rotor;
   a reservoir carried by the passageway and hopper and enclosing said first and second sprockets; and
   fluid in said reservoir for lubricating said first and second sprockets.

32. The loading apparatus of claim 28 wherein conveying means are carried by the hopper;
   means for driving the conveying means for moving the feed stock into the hopper; and
   means for raising the conveying means relative to the housing during transport of the loading apparatus from one location to another.

33. In an apparatus for loading feed stock into agricultural bags having a housing with a hopper, a passageway and a tunnel, an agricultural bag expandably affixed to said tunnel and having a closed end closing the mouth of the tunnel, a rotor rotatably mounted in said passageway, means for driving said rotor to move feed stock from the hopper through the passageway and into the tunnel and brake means for resisting relative movement between the loading apparatus and the closed end of the bag, the improvement comprising:
   said tunnel having an expanding chamber comprised of a horizontal bottom wall, side walls diverging from said passageway and a back wall;
   a forming chamber having an inlet end and an outlet end, the inlet end joining with the expanding chamber and extending forwardly thereof;
   said rotor having a plurality of pairs of teeth formed on the periphery of said rotor, each pair of teeth being offset circumferentially from the next adjacent pair of teeth and with the axial space between the teeth of one pair and the adjacent pair being equal to the spacing between each tooth of a pair of teeth;
   a cross beam is mounted on the housing with prongs carried by the cross beam and extending between each pair of teeth and each adjacent pairs of teeth for stripping feed stock from the teeth of the rotor; whereby the rotor will force feed stock into the tunnel to completely fill the tunnel and the closed end of the bag, the pressure of the feed stock forced into the filled tunnel overcoming the loading on the brake means to urge the loading apparatus rearward as the rotor maintains the tunnel and the bag filled.

34. In the loading apparatus of claim 33 wherein a plate is affixed to the forward face of the cross beam and overhangs between adjacent prongs, said plate cleaning feed stock from the teeth and guiding the feed stock along a planar path aligned with the back wall of the tunnel for guiding the feed stock into the expanding chamber of the tunnel.

35. In an apparatus for loading feed stock into agricultural bags having a housing with a hopper, a passageway and a tunnel, an agricultural bag expandably affixed to said tunnel and having a closed end closing the mouth of the tunnel, a rotor rotatably mounted in said passageway, means for driving said rotor to move feed stock from the hopper through the passageway and into the tunnel and brake means for resisting relative movement between the loading apparatus and the closed end of the bag, the improvement comprising said tunnel having an expanding chamber comprised of a horizontal bottom wall, side walls diverging from said passageway and a back wall forming an angle slightly less than 90° with the longitudinal axis of the apparatus;

a forming chamber having an inlet end and an outlet end joining with a leading edge of the expanding chamber and extending forwardly of the expanding chamber;

a plurality of teeth formed on said rotor, with selected teeth being displaced circumferentially and axially with respect to adjacent teeth, a cross beam on the housing;

prongs affixed to the undersurface of the cross beam and extending into close proximity with the surface of the rotor between adjacent teeth on the rotor; whereby initially the rotor will force feed stock into the tunnel to completely fill the tunnel and the closed end of the bag, the expanding chamber accepting newly treated feed stock as the forming chamber shapes the mass of feed stock as the loading apparatus moves away from the filled end of the bag.

* * * * *